United States Patent [19]

Schnürer

[11] Patent Number: 4,585,281
[45] Date of Patent: Apr. 29, 1986

[54] PRESSURE-OPERATED BRAKE SYSTEM FOR AUTOMOBILES

[75] Inventor: Otmar Schnürer, Gifhorn, Fed. Rep. of Germany

[73] Assignee: Volkswagenwerk Aktiengesellschaft, Wolfsburg, Fed. Rep. of Germany

[21] Appl. No.: 599,763

[22] Filed: Apr. 13, 1984

[30] Foreign Application Priority Data

Apr. 14, 1983 [DE] Fed. Rep. of Germany ....... 3313519
Apr. 22, 1983 [DE] Fed. Rep. of Germany ....... 3314712

[51] Int. Cl.⁴ .............................................. B60T 8/40
[52] U.S. Cl. .................................... 303/116; 303/119
[58] Field of Search ............... 303/110, 111, 113, 115, 303/116, 119, 96, 109; 188/181 A

[56] References Cited

U.S. PATENT DOCUMENTS

| 3,740,103 | 6/1973 | Sweet et al. | 303/110 |
| 3,840,278 | 10/1974 | Fleischer et al. | 303/111 X |
| 4,093,317 | 6/1978 | Lindemann et al. | 303/119 X |
| 4,312,543 | 1/1982 | Kubota | 303/119 X |
| 4,477,125 | 10/1984 | Belart et al. | 303/119 X |

FOREIGN PATENT DOCUMENTS 2437066 2/1976 Fed. Rep. of Germany ........ 303/11
2812000 9/1979 Fed. Rep. of Germany .
3119153 12/1982 Fed. Rep. of Germany .

Primary Examiner—Bruce H. Stoner, Jr.
Assistant Examiner—Robert J. Oberleitner
Attorney, Agent, or Firm—Brumbaugh, Graves, Donohue & Raymond

[57] ABSTRACT

In the particular embodiments described in the specification, a pressure-actuated brake system for motor vehicles with a brake slip control includes a control means electronically detecting the commencement of a brake slip control operation to provide a signal to increase the brake pressure of at least some of the other wheels which are not yet under brake-slip regulation. The pressure applied to those wheels is increased above the pressure inherently applied by the operator's actuation of the brake pedal at the wheel brake cylinder until such time as brake slip regulation commences at those wheels as well.

5 Claims, 4 Drawing Figures

PRESSURE-OPERATED BRAKE SYSTEM FOR AUTOMOBILES

BACKGROUND OF THE INVENTION

To ensure that the rear wheels of a motor vehicle will not lock sooner than the front wheels, it is common practice to distribute the brake forces among the axles of the vehicle in such a way that the braking effect is more fully utilized at the front axle than at the rear axle. This arrangement affords good directional stability during braking. On the other hand, this has the disadvantage that the maximum physically possible vehicle deceleration is not attained because, at least part of the time, a lower braking force is applied by way of the rear wheels than would otherwise be possible. These design criteria have been reflected in statutory provisions.

Because of this brake force distribution even in motor vehicles equipped with brake slip regulating means (i.e., antilocking or antiskid systems) for all wheels or all axles of the vehicle, brake slip regulation will generally commence first at the front axle of the vehicle. In fact, such slip regulation occurs at a time when the maximum possible brake forces have not yet been attained at the rear axle. In many cases, therefore, even in motor vehicles with brake slip regulation, the maximum possible vehicle deceleration is not achieved. It will be achieved only in those special cases where the operator deliberately increases the brake system pressure to such an extent that, although brake slip regulation has commenced at the front axle, the maximum possible brake force, or the forces sufficient to cause brake slip regulation, will also be applied at the rear axle.

The object of the invention is to provide an improved pressure-actuated brake system in vehicles having brake slip regulation including sensors to monitor the braking condition at each wheel so as to avoid brake locking which is arranged so that the vehicle deceleration will be increased upon braking and commencement of brake slip regulation on only some of the wheels.

SUMMARY OF THE INVENTION

In accordance with the present invention, an electronic regulating and control means detects the commencement of brake slip regulation, and, when brake slip regulation commences at only one of the wheels, or alternatively at both wheels of only one axle, generates a regulating or control signal that is employed to elevate the brake pressure into the brake slip regulation region, that is, beyond the pressure inherently applied at the wheel brake cylinder by the operator's actuation of the brake pedal, at additional, or alternatively, at all wheels where brake slip regulation has not yet commenced.

In general, it would be desirable to design the regulating and control means in such a way that the brake pressure is elevated at the wheels of the rear axle or axles only. That is, if only one of the two front wheels has become brake slip regulated, the other, as yet not brake-slip-regulated, one of the front wheels would be left in unregulated condition.

Advantageously, a brake pressure reservoir may be provided which is brought into effective communication by the regulating or control signal with the brakes of the wheels not yet brake-slip-regulated so as to elevate their brake pressure above the value inherently applied at the wheel brake cylinder by the operator's actuation of the brake pedal until such time as brake slip regulation has commenced on these wheels also.

Such an arrangment requires a special brake pressure reservoir. Such reservoirs already exist in brake systems where the brake pressure is generated with the aid of an hydraulic booster valve, as disclosed for example in U.S. Pat. No. 4,379,423 or German Pat. No. 2,602,050. In many cases, however, the pressure reservoir is not a part of a brake system.

On the other hand, it is the almost universal practice to provide brake force distributors, such as brake pressure reducers or limiters which provide a kink in the characteristic curve for the brake pressure lines leading to the rear-wheel brakes, in order to bring the actual brake force distribution of the vehicle close to the ideal. Inasmuch as the ideal brake force distribution depends upon the vehicle load, the brake force distributors are often designed so that the kink in the characteristic curve will also vary as a function of load, as represented in FIG. 4 of the accompanying drawing.

In such brake systems, the brake force distribution means may advantageously be of an alternative arrangement so that its pressure reducing or limiting action can be cut out by the regulating or control signal. Advantageously, the brake force distribution system may be equipped for this purpose with a parallel by-pass capable of being cut in, i.e. opened, by the regulating or control signal.

It is known in principle that a brake force distribution system may have a parallel by-pass, particularly for vehicles where the front-wheel brakes and the rear-wheel brakes are arranged in separate circuits. In event of failure of the front axle brake circuit, however, such known bypass arrangements eliminate the reduction or limitation of the brake pressure acting at the rear wheel brakes by the brake force distribution system, since the bypass is opened if the front axle brake circuit fails.

According to the invention, on the other hand, the reduction effected by the brake force distribution means acts while the brake circuits are completely intact. Thus a regulating or control signal from a regulating or control means electronically indicating commencement of the brake slip regulating operation at one or more wheels is utilized to eliminate the limiting or reducing effect of the brake pressure distributors. This is preferably accomplished by triggering the opening of the by-pass means in parallel with the brake force distributors.

Such elimination of the reducing or limiting action of the brake force distribution means results in a desirable elevation of the brake pressure for the rear wheel brakes.

BRIEF DESCRIPTION OF THE DRAWINGS

The invention will now be further described with respect to preferred embodiments shown in the drawings by way of example, in which.

DESCRIPTION OF PREFERRED EMBODIMENTS

Figure 1:
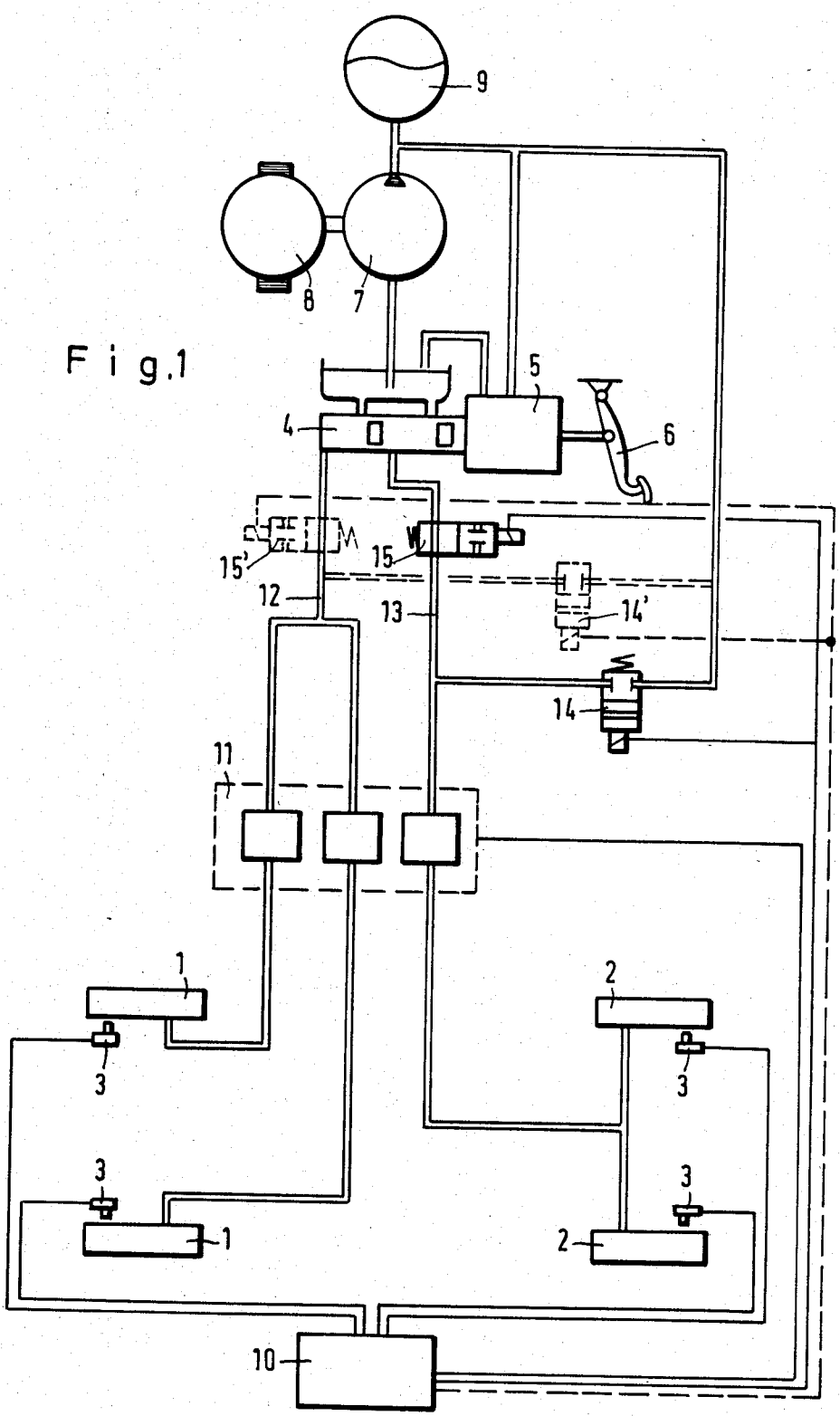
FIG. 1 is a schematic block diagram showing one embodiment of a pressure-actuated motor vehicle brake system according to the invention having a brake pressure reservoir.

In the several figures of the drawings corresponding parts are indicated by like reference numerals.

The typical hydraulic motor vehicle brake system represented in FIG. 1 is in the form of a two-circuit brake system, such that the brakes of the front wheels 1 of a vehicle are connected to a first brake circuit supplied by a brake line 12 and the brakes of the rear wheels 2 of the vehicle are connected to an independent second brake circuit supplied by a brake line 13. Accordingly, a main brake cylinder 4, actuable by the vehicle operator by means of a brake pedal 6, is in the form of a two-circuit main cylinder, for example, a tandem cylinder. In embodiments illustrated by way of example, the cylinder 4 is actuated not directly but through a brake force booster 5, such as an hydraulic brake force booster, as disclosed for example in, German Pat. No. 2,602,050 or in U.S. Pat. No. 4,379,423. The hydraulic brake force booster 5 receives the high-pressure hydraulic liquid required for its operation from an hydraulic pump 7 driven by a motor 8 and a brake pressure reservoir 9.

The hydraulic brake system is equipped with a conventional brake slip regulating (i.e. antilocking or antiskid) system. The regulating system comprises an electronic antilock regulating or control unit 10, four sensors 3, one assigned to each of the vehicle wheels 1 and 2, to ascertain the condition of wheel motion, and an hydraulic unit 11 arranged between the main brake cylinder 4 and the wheel brake cylinders of the brakes, not shown in detail, of the wheels 1 and 2. The hydraulic unit 11 is controlled in a conventional manner by the electronic antilocking regulating or control system 10 so that the brake pressure of at least the wheel signaled as locking-endangered will at least be kept constant, or alternatively even reduced, for such time as the danger of locking continues. Since many such regulating means for brake slip control are well known, the electronic antilocking control unit 10 and hydraulic unit 11 need not be described in detail.

The brake pressure reservoir 9 communicates in addition, by way of an unnumbered hydraulic line and an electrically actuable first magnetic valve 14, with the brake line 13. This first magnetic valve 14 is normally closed, as shown. An electrically actuable second magnetic valve 15 is arranged along the brake line 13 between the main brake cylinder 4 and the line junction connected with the first magnetic valve 14. This second magnetic valve is normally open, i.e. clear, as shown. Both magnetic valves 14 and 15 are controlled, i.e. turned on or off, by a conventional electronic regulating control means which, in this embodiment, is an integral part of the conventional electronic antilock regulating or control unit 10.

When the sensors 3 signal the electronic antilocking regulating or control unit 10 that one of the vehicle wheels is in danger of locking, or has already begun to lock, this will operate the hydraulic unit 11 in the usual manner so that the brake pressure applied to the endangered or locking wheel is reduced. In other words, the usual brake slip regulation commences.

The aforementioned conventional electronic regulating or control means inside the electronic antilock regulating or control unit 10 detects the commencement of this brake slip regulation and generates regulating or control signals whereby the first and second magnetic valves 14 and 15 are actuated. In other words, at the outset of brake slip regulation, the magnetic valves 14 and 15 are switched from their normal to their actuated condition so that the second magnetic valve 15 interrupts the line connection from the main brake cylinder 4 and the first magnetic valve 14 establishes a direct line connection from the brake pressure reservoir 9 to the brake line 13 entering the hydraulic unit 11. This causes the brake pressure for the brakes of the rear wheels 2 to be increased above the value delivered by the main brake cylinder 4 and inherently applied by the driver's actuation of the brake pedal 6. As a result, the brake forces applied through the rear wheels, and consequently the vehicle deceleration, are increased in the desired manner.

Furthermore, since the pressure line opened by the first magnetic valve 14 enters the brake line 13 ahead of the hydraulic unit 11, the brake pressure applied to the rear wheels 2 is increased only until such time as those wheels or one of them is in danger of locking. At that time, in response to the appropriate signals from the sensors 3, the part of the hydraulic unit 11 assigned to the rear wheels becomes operative to regulate brake slip in the usual manner. In other words, a further increase in the brake pressure applied to them is prevented, or the applied brake pressure is even lowered if necessary.

As mentioned above, because of the conventional brake force distribution, even in motor vehicles equipped with a brake slip regulating means, one of the front wheels will usually be the first wheel in danger of locking. That is the assumption in the foregoing functional description. To simplify the instrumentation and control arrangements, it is therefore advantageous to make the foregoing provision affecting the pressure in the brake line leading to the brakes of the rear wheels 2 only. In other words, a first magnetic valve 14 and a second magnetic valve 15 are provided only in this part of the system.

In principle, however, such magnetic valves and controls might also be provided in the brake line 12 leading to the front wheels 1. In FIG. 1, such a first magnetic valve 14' and second magnetic valve 15' and related control lines are illustrated in dotted lines.

To ensure that the rear wheels of a motor vehicle will in no case lock sooner than the front wheels, it is almost universal practice to employ brake force distributors, i.e. reducers or limiters, having a kinked characteristic curve in the brake pressure lines leading to the rear wheel brakes. These are designed to bring the actual brake force distribution of the motor vehicle close to the ideal brake force distribution. Frequently such brake force distributors are designed to respond to variations in vehicle load.

Figure 2:
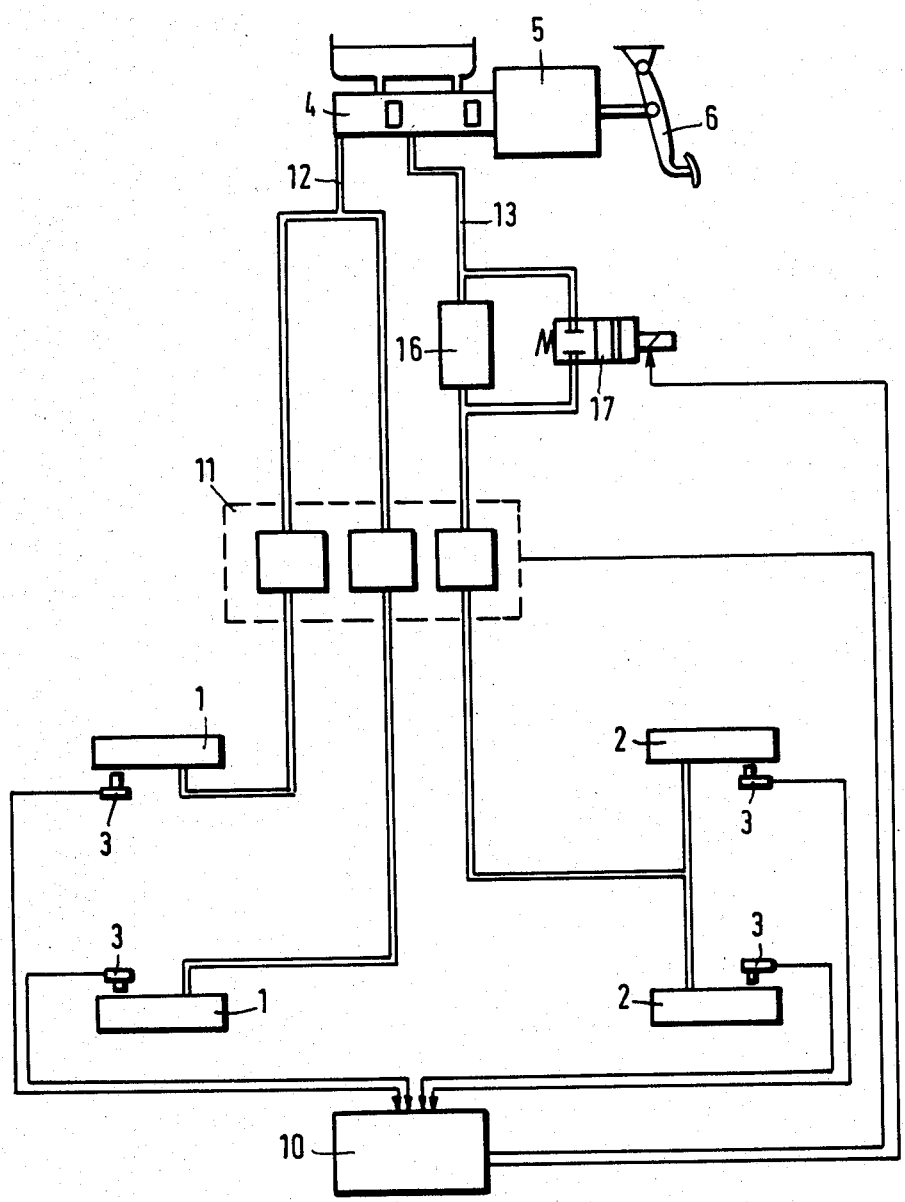
FIG. 2 is a schematic block diagram showing a second embodiment of a pressure-actuated motor vehicle brake system according to the invention having a brake force distribution means but no brake pressure reservoir.
Figure 3:
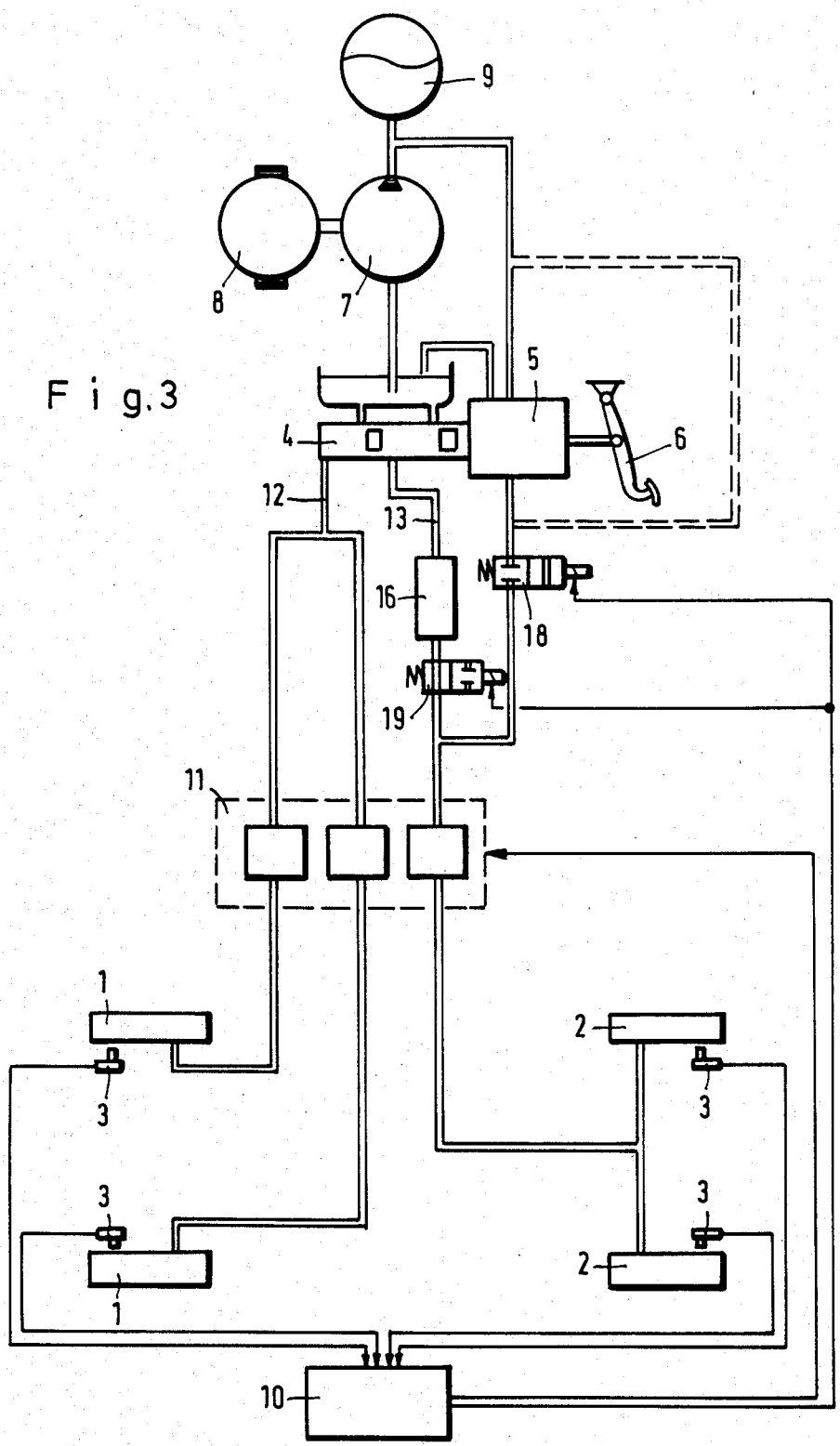
FIG. 3 is a schematic block diagram showing an embodiment of a pressure-actuated motor vehicle brake system according to the invention having a brake force distribution means and a brake pressure reservoir.

Hydraulic brake systems of this type are illustrated in FIGS. 2 and 3. These are essentially similar to the brake system represented in FIG. 1. In the brake line 13 leading to the rear wheels 2, however, a conventional brake force distribution system 16 is interposed between the main brake cylinder 4 and the hydraulic unit 11.

Figure 4:
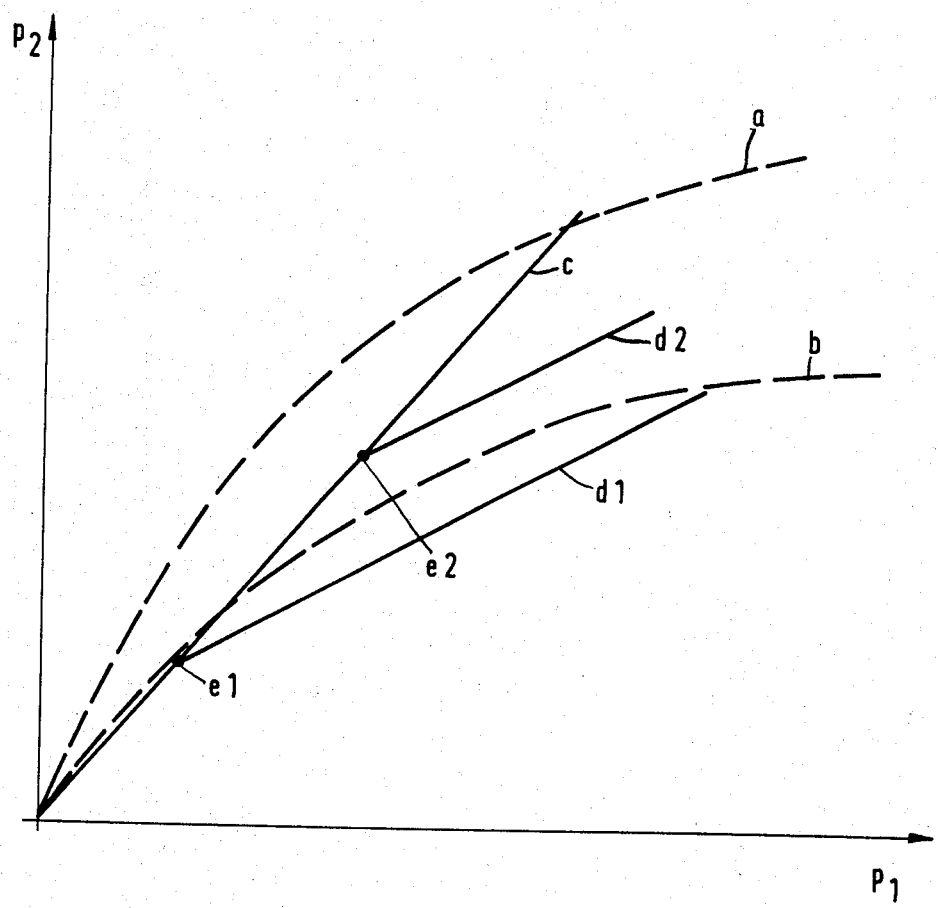
FIG. 4 is a graphical representation illustrating the brake pressure for the rear wheel brakes as a function of the brake pressure delivered by the main brake cylinder.

The distribution system 16 may, in particular, be a brake pressure reducer dependent on load. FIG. 4 of the drawing shows the characteristic curve of such a brake pressure reducer. In this figure, the ideal brake pressure distribution of a motor vehicle under different load conditions is qualitatively represented by the dashed curves "a" and "b", the brake pressure applied to the brakes of the rear wheels 2 is represented by $p_2$, and $p_1$ represents the brake pressure supplied by the main brake cylinder 4. The upper curve, representing the full-load condition, is marked "a" and the lower curve, representing the no-load condition is marked "b". The actual brake force distribution of a vehicle equipped with a variable-load brake force distributor means, in this case a brake pressure reducer, is qualitatively indicated by the solid lines in FIG. 4. Those lines show a kinked curve, or family of curves, in which the position of the kink varies with load. For two load conditions arbitrarily selected, which are designated $e_1$ and $e_2$, the corresponding branches of the characteristic curve are indicated by $d_1$ and $d_2$.

In the hydraulic brake system illustrated in FIG. 2, the desired increase in the brake pressure applied to the brakes of the rear wheels 2, for which brake slip regulation has not yet commenced, upon commencement of brake slip regulation at one of the other wheels, is realized in that the brake force distribution means 16 is switched at this time by the electronic regulating or control means of the electronic antilock regulating or control unit 10 in such manner that its pressure reducing or limiting action (depending on whether it is in the form of a brake pressure reducer or a brake pressure limiter) is eliminated.

For this purpose, the brake pressure distribution means 16 is connected in parallel with a normally closed by-pass means in the form of an electrically switchable magnetic valve 17 which can be opened by the regulating or control signal supplied by the electronic regulating or control means. In other words, the brake pressure for the rear wheels is increased by the control signal when the front wheels or either of them are reported to be in danger of locking and brake slip regulation commences on these front wheels. Then the brake pressure for the rear wheels is increased to a pressure above the momentary pressure value controlled by the brake force distribution means but not higher than the pressure from the main brake cylinder 4.

In this embodiment, also by way of example, the brake pressure distribution means 16 is capable of being switched on and off between the main brake cylinder 4 and the hydraulic unit 11. This ensures that, although the brake action applied through the rear axle is increased, and with it the deceleration of the vehicle, locking of the rear wheels 2 is nevertheless effectively prevented by suitable control action of the hydraulic unit 11.

The further variant represented in FIG. 3 is essentially similar to the arrangement in FIG. 2. Here again, a brake pressure distribution means 16 is interposed between the main hydraulic cylinder 4 and the hydraulic unit 11. In this embodiment by way of example, however, the desired increase of brake pressure for the rear wheels 2 upon commencement of a brake slip regulation for the front wheels 1 is not achieved simply by bridging the brake pressure distribution means 16 with a by-pass means connected directly in parallel with it. Instead, the pressure increase is achieved by the operation of two additional electrically switchable magnetic valves 18 and 19.

One magnetic valve 18, which is normally closed as shown, is arranged to connect a line between one output of the hydraulic brake force booster 5, or, as shown in dotted lines, between the brake pressure reservoir 9 and the brake line 13 entering the hydraulic unit 11. The second additional magnetic valve 19, which is normally open, is arranged between the brake force distribution means 16 and the connection with the line from the magnetic valve 18. When this valve is actuated, the line connection between the brake force distribution means 16 and the hydraulic unit 11 is interrupted.

With this arrangement, when commencement of a brake slip regulating operation is detected at the front wheels, the magnetic valves 18 and 19 are actuated by control signals delivered by the electronic regulating means in the electronic antilock regulating or control unit 10. This causes the brakes of the rear wheels 2 to be disconnected from the reduced or limited pressure applied by the brake force distribution means 16 and to be subjected to the comparatively higher pressure of the hydraulic brake force booster 5 or brake pressure reservoir 9. In this variant also, locking of the rear wheels 2 as a result of the thus elevated brake pressure is prevented by suitable operation of the hydraulic unit 11.

Accordingly, in the embodiments of FIGS. 2 and 3, when the electronic regulating or control means actuates the magnetic valve 17 in parallel with the brake force distribution means 16 and/or the additional magnetic valves 18 and 19, the brake pressure $p_2$, for the brakes of the rear wheels 2, rises from a reduced value determined by the flat branch $d_1$ or $d_2$ of the characteristic curve shown in FIG. 4 to a level at which brake slip regulation will commence for the rear wheels as well. In the embodiment of FIG. 2, however, the pressure $p_2$ is increased to a maximum value determined by the steep branch c, which represents the unlimited or unreduced initial pressure of the main brake cylinder 4.

In the embodiments shown by way of example, a two-circuit brake system of the "black-and-white" type is represented, that is, one in which one brake circuit pertains to the front wheels and the other pertains to the rear wheels. The invention is not limited to brake systems of this type. Obviously other circuit allocations may be made, for example a diagonal division. It will be apparent to those skilled in the art that, in that case, the circuit and control elements required to practice the invention must be arranged accordingly. In other words, in a diagonal subdivision, for example, two brake pressure reducers—one for each rear-wheel brake—must be provided, and by-pass means and/or magnetic valves must be provided for both brake pressure reducers.

I claim:

1. A pressure-actuated brake system for a motor vehicle having a plurality of wheels with corresponding wheel brakes comprising electronic brake slip regulating means including sensor means for monitoring the condition of wheel motion at each of the wheels to produce a signal indicating danger of wheel brake locking at the corresponding wheel and antilocking regulating means responsive to signals received from the sensor means to produce control signals, a main brake cylinder, brake pedal means for actuating said main brake cylinder, a hydraulic unit arranged between the main brake cylinder and the wheel brakes and responsive to control signals from the antilocking regulating means to apply pressure to the wheel brakes in such manner that the brake pressure of any locking-endangered wheel is reduced for such time as the danger of locking continues, and wherein the electronic regulating means transmits a control signal to hydraulic control means to produce an increase in the brake pressure, above the pressure resulting from actuation of the main brake cylinder by the brake pedal means, for at least some of those wheels at which a brake slip regulation has not yet commenced in response to initiation of the brake slip regulation at one wheel.

2. A pressure-actuated brake system according to claim 1 wherein the hydraulic control means responds to the control signal to increase the brake pressure for only the rear wheels of the vehicle.

3. A pressure-actuated brake system according to either claim 1 or claim 2 including a brake pressure reservoir which is connected by the hydraulic control means to the brakes of the wheels which are not yet in danger of locking until the brake slip regulation has commenced at those wheels as well.

4. A pressure-actuated brake system according to either claim 1 or claim 2, including brake force distribution means arranged in the brake pressure line leading to the rear wheels of the vehicle to produce a pressure-controlling action therein, and wherein the brake force distribution means is responsive to a control signal from the regulating means to eliminate the pressure-controlling action thereof.

5. A pressure-actuated brake system according to claim 4 wherein the brake force distribution means includes normally closed parallel by-pass means and wherein the distribution means is responsive to a control signal from the regulating means to open the by-pass means.

* * * * *